April 6, 1954   J. FISHER   2,674,536
PRECOOKED FROZEN FOOD PACKAGE
Filed Dec. 29, 1948   4 Sheets-Sheet 2
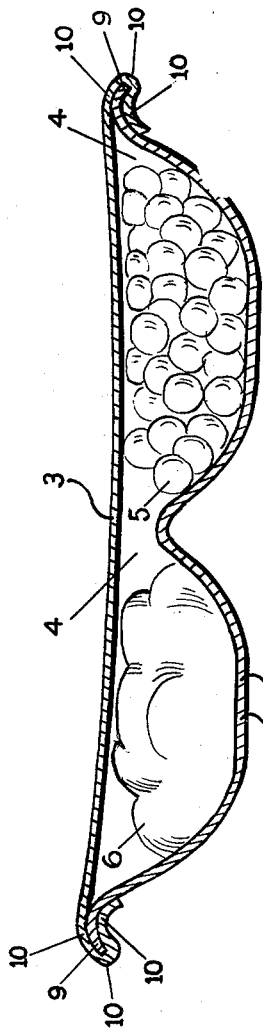
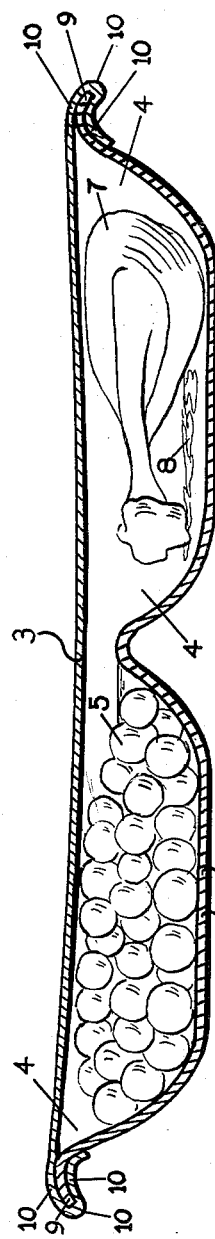
INVENTOR.
Jacob Fisher
BY
Caesar and Rivise
ATTORNEYS.

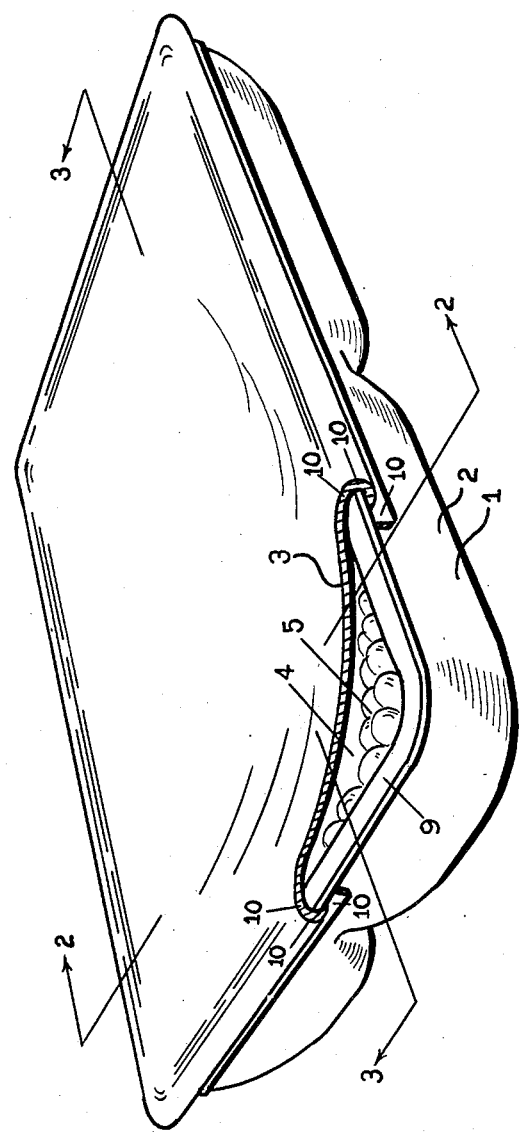

April 6, 1954   J. FISHER   2,674,536
PRECOOKED FROZEN FOOD PACKAGE
Filed Dec. 29, 1948   4 Sheets-Sheet 3

INVENTOR.
Jacob Fisher
BY
Caesar and Rivise
ATTORNEYS.

April 6, 1954 J. FISHER 2,674,536
PRECOOKED FROZEN FOOD PACKAGE
Filed Dec. 29, 1948 4 Sheets-Sheet 4
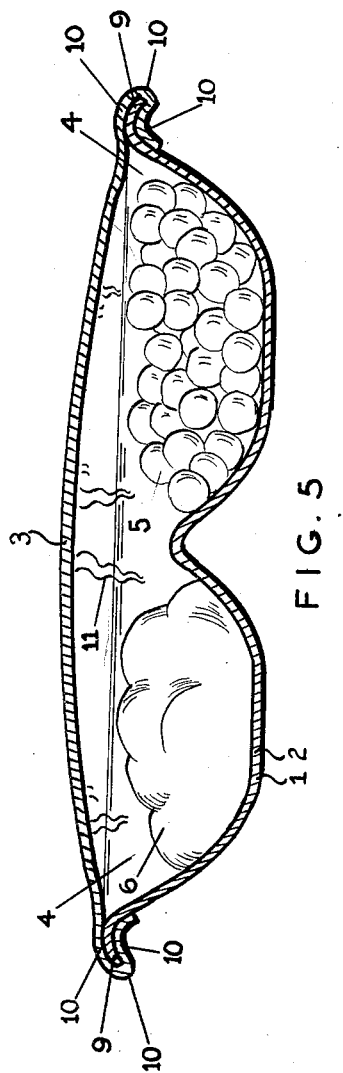
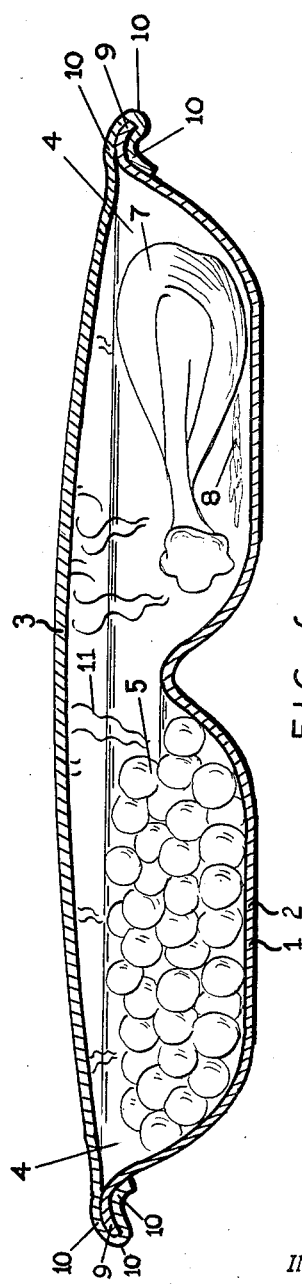
INVENTOR.
Jacob Fisher
BY Caesar and Rivise
ATTORNEYS.

Patented Apr. 6, 1954

2,674,536

UNITED STATES PATENT OFFICE 2,674,536

PRECOOKED FROZEN FOOD PACKAGE

Jacob Fisher, Philadelphia, Pa.

Application December 29, 1948, Serial No. 67,846

5 Claims. (Cl. 99—192)

This invention relates to containers in which food may be frozen, held, transported, and reheated.

Containers of this type are especially useful in instances where food is first cooked and then frozen at a central plant; kept in a suitable refrigerator in said central plant for a greater or lesser period of time; transported from said central plant in suitable refrigerators to another place or succession of places where it is kept for a greater or lesser period of time and reheated and served. An example of this type of use is the cooking and freezing of food at a central plant; transporting said frozen food and delivering same to an airplane; and then reheating and serving of said frozen food on said airplane.

The prior art containers of this class were made of the combination of a paper or cardboard tray with a partial cover. These containers were objectionable for at least the following reasons:

(a) They could not be heated beyond 350° F. otherwise the tray would scorch and/or burn.

(b) It was necessary to build special comparatively expensive and complicated ovens in order to make certain that the trays would not be heated beyond 350° F.

(c) These ovens were comparatively heavy, a feature particularly objectionable in airplanes.

(d) The cooked food could not be frozen directly in the paper and cardboard containers because it would absorb the wood pulp odors which in turn would result in an objectionable flavor in the food.

(e) Even in its frozen state the food absorbs the pulp odors, the amount of absorption being dependent upon the time that the food remained in the containers. At the end of three months the absorption is such as to render the food unfit for use.

(f) The food absorbs the pulp odors when it is inadvertently defrosted.

(g) The food becomes at least partially dehydrated when it is reheated.

It is one of the objects of this invention to produce a container for freezing, holding, transporting, and reheating food which will be free of the foregoing objections.

It is another of the objects of this invention to produce a container for freezing, holding, transporting, and reheating food which will be comparatively easy to manufacture and to assemble and use.

It is another of the objects of this invention to produce a container for freezing, holding, transporting, and reheating food which will be at least as light as the prior art units but which will be stronger and more rigid than said prior art units.

I attain the foregoing as well as other objects by making the container of two elements—namely, a tray and a complete cover, forming the tray of thin metal, and forming the cover of thin metal foil. I prefer to use thin light metal and thin light metal foil as for instance aluminum. I also prefer to form the tray with a lip.

For the purpose of disclosing my invention with the particularity required by law I have shown in the drawings which form a part hereof and will now describe an embodiment thereof.

In said drawings Fig. 1 is a perspective view of my novel container when it and its contents are frozen. A portion of the cover has been broken away to show otherwise hidden structural features.

Fig. 2 is a section on the line 2—2 of Fig. 1.

Fig. 3 is a section on the line 3—3 of Fig. 1.

Fig. 5 is a section along the line 5—5 of Fig. 4.

Fig. 6 is a section along the line 6—6 of Fig. 4.

Figure 4:
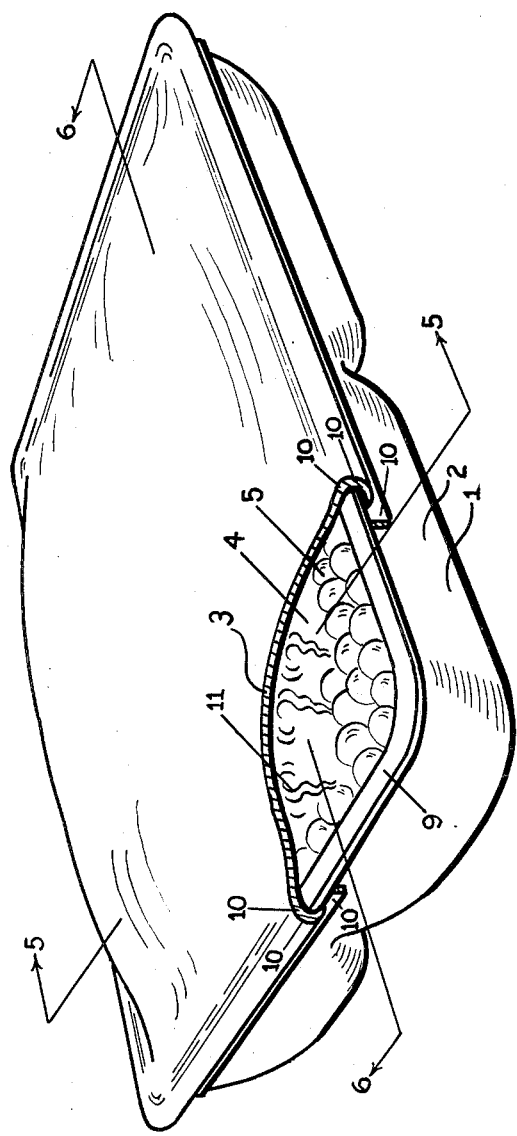
Fig. 4 is a perspective view of my novel container when it and its contents have been heated. A portion of the cover has been broken away to show otherwise hidden features.

Referring more particularly to the drawings wherein similar reference numerals denote similar parts, reference numeral 1 designates my novel container for holding food and in which food is to be heated.

The container 1 consists of a tray 2 made of thin and preferably light metal and a cover 3 made of thin and preferably light metal foil. An example of thin and light metal which may be used in making the tray 2 is .012" aluminum sheets. An example of thin and comparatively light metal foil which can be used in making the cover 3 is .0007" pure aluminum foil.

The tray 2 has formed therein any desired number of compartments 4 which contain food items 5, 6, and 7 and food juices or gravy 8.

The tray 2 has formed thereon the lips 9 which are encompassed by the edges 10 of the cover 3. The cover 3 and its edges 10 which encompass the lips 9 of the tray 2 combine with the body of the tray 2 to seal said tray and its contents.

In practising the invention the food items 5, 6, and 7 which are to be frozen, held, transported, and reheated in the container 1 are individually cooked in any manner known in the cooking art. These items 5, 6, and 7 plus the food juices or gravy 8 are placed in the compartments 4 formed in the tray 2. Then the cover 3 is placed upon the container 1 and its edges 10 caused to encompass the lips 9 of the tray 2 thereby sealing the contents of said tray. The container 1 and its contents are now placed in appropriate refrigeration compartments and frozen. The appearance of the unit at this point is shown in Figs. 1, 2, and 3. The unit may be transferred from refrigerated compartment to refrigerated compartment as from the cold storage compartment in the plant where it has been assembled to the refrigerated compartment of an airplane. When it is desired to serve the food in the unit one merely places the container 1 and its contents over a flame or in any type of heating unit and heats same to whatever point desired for use, using any cooking temperature desired. At this point at least some of the gravy and food juices vaporize, as is schematically designated by the reference numeral 11, but the food is not dehydrated because the free edges 10 of the cover 3 encompass and adhere to the lips 9 of the tray 2 thereby sealing the container and preventing the moisture from escaping. The appearance of the container and its contents at this point is shown in Figs. 4, 5, and 6. After it has been heated to the desired point the cover 3 is removed in any manner desired and the tray 2 plus its contents served to the diner or the entire unit including the cover is served to the diner. In the latter case the diner removes the cover 3. One of the many ways to remove the cover 3 is to slit same at any point with a suitable instrument and then tear same away.

Having described my invention what I claim as new and useful is:

1. An article of manufacture consisting of an open top tray of thin, substantially rigid light metal, a peripheral lip at the top of said tray, frozen food adapted to be reheated prior to consumption carried in said tray, and a sheet of light metal foil covering the top of said tray and said frozen food, said sheet of foil including a free edge portion bent around said peripheral lip.

2. An article of manufacture consisting of an open top tray of thin, substantially rigid light metal, frozen food adapted to be reheated prior to consumption carried in said tray, and a sheet of light metal foil covering said frozen food and secured to the top of said tray.

3. The article of claim 2 wherein said tray is made of aluminum.

4. The article of claim 2 wherein said sheet of foil is made of aluminum.

5. The article of claim 2 wherein said tray and said sheet of foil are made of aluminum.

References Cited in the file of this patent.

UNITED STATES PATENTS

| Number | Name | Date |
|---|---|---|
| 1,554,077 | Fay | Sept. 15, 1925 |
| 1,576,083 | Bunz | Mar. 9, 1926 |
| 1,689,018 | Froidevaux | Oct. 23, 1928 |
| 1,955,484 | Birdseye | Apr. 17, 1934 |
| 2,125,620 | Schlumbohm | Aug. 2, 1938 |
| 2,166,278 | Alderfer | July 18, 1939 |
| 2,177,359 | Baker | Oct. 24, 1939 |
| 2,271,156 | Walker | Jan. 27, 1942 |
| 2,271,921 | Luker | Feb. 3, 1942 |
| 2,364,049 | Bensel | Dec. 5, 1944 |
| 2,495,435 | Welch | Jan. 24, 1950 |